July 11, 1944.　　　　W. CECIL　　　　2,353,126
HOG FEEDER
Filed Feb. 4, 1942　　　2 Sheets-Sheet 1
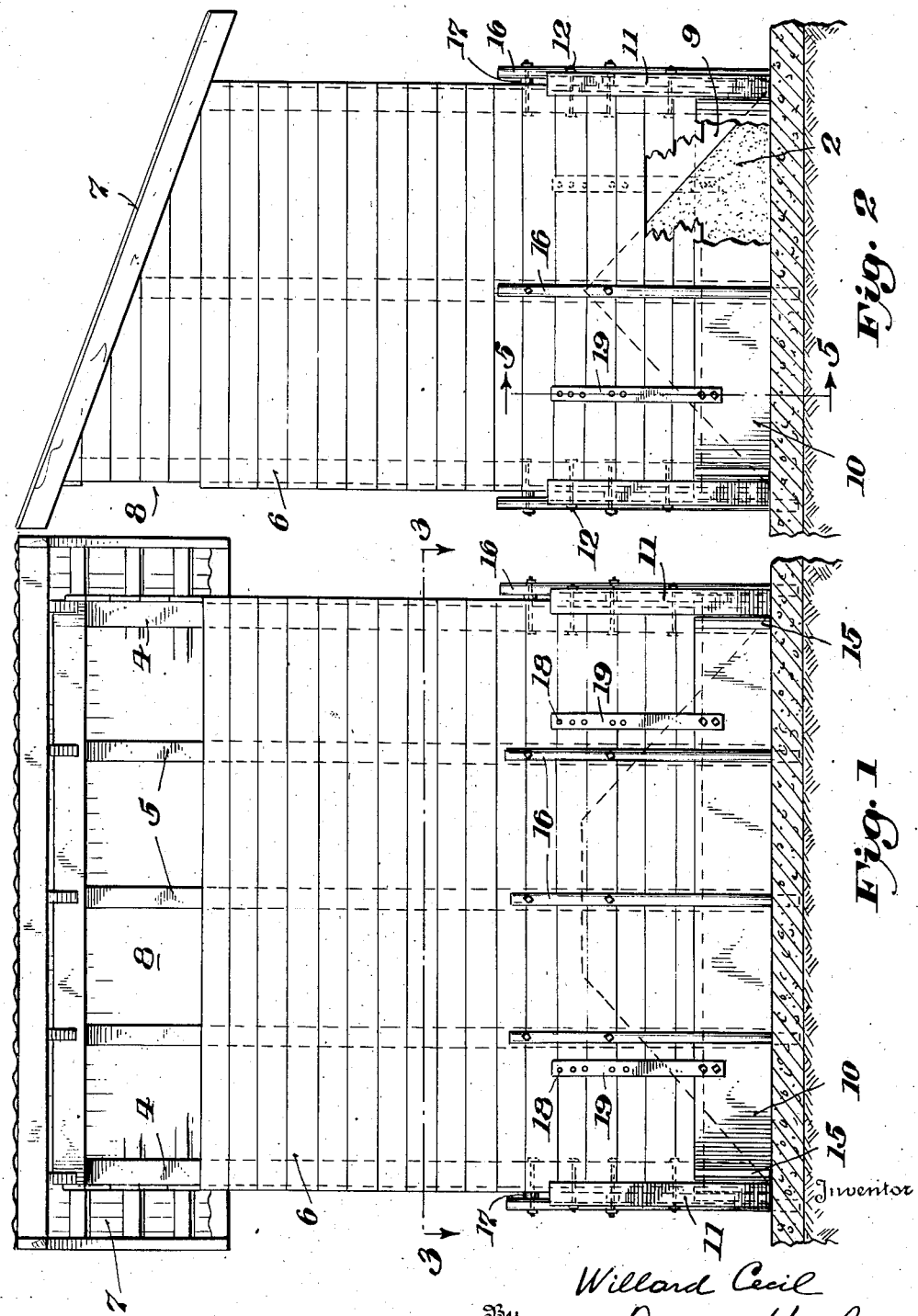

July 11, 1944.                W. CECIL                    2,353,126
                             HOG FEEDER
                       Filed Feb. 4, 1942          2 Sheets-Sheet 2

Inventor
Willard Cecil
Dype & Kirchner
By
                              Attorneys Patented July 11, 1944

2,353,126

UNITED STATES PATENT OFFICE 2,353,126

HOG FEEDER

Willard Cecil, Parker, Ind.

Application February 4, 1942, Serial No. 429,565

1 Claim. (Cl. 20—1.2)

The present invention relates to building structures of the class generally known as hog feeders, i. e., it comprises an enclosure adapted to contain grain or the like, such as ear corn, provided with means for allowing the feed to be dispensed by gravity through a suitably controlled aperture so that it may be made accessible to the animals to be fed.

More particularly, the present invention concerns the aperture controlling means and aims to provide an adjustable gate which can be easily manipulated to regulate the effective size of the aperture so as expeditiously to control the issue and rate of issue of the contents of the feeder.

More specific objects of the invention are the provision of a structure of the class described which will be simple and inexpensive to build, and will be foolproof in operation and generally more practical and superior to the best prior art devices of which I am aware.

In compliance with the statute, the appended drawings and the following specification disclose a preferred embodiment of the invention which has proved thoroughly practical and satisfactory in actual use. But this preferred embodiment is given by way of example only, it being understood that the broad principles of the invention may be otherwise embodied in variously modified forms, all of which are to be deemed within the scope of the invention as pointed out by the appended claim.

In the drawings:

Figure 1 is a front elevational view of a structure made according to the principles of the invention;

Fig. 2 is an end elevational view;

Figure 3:
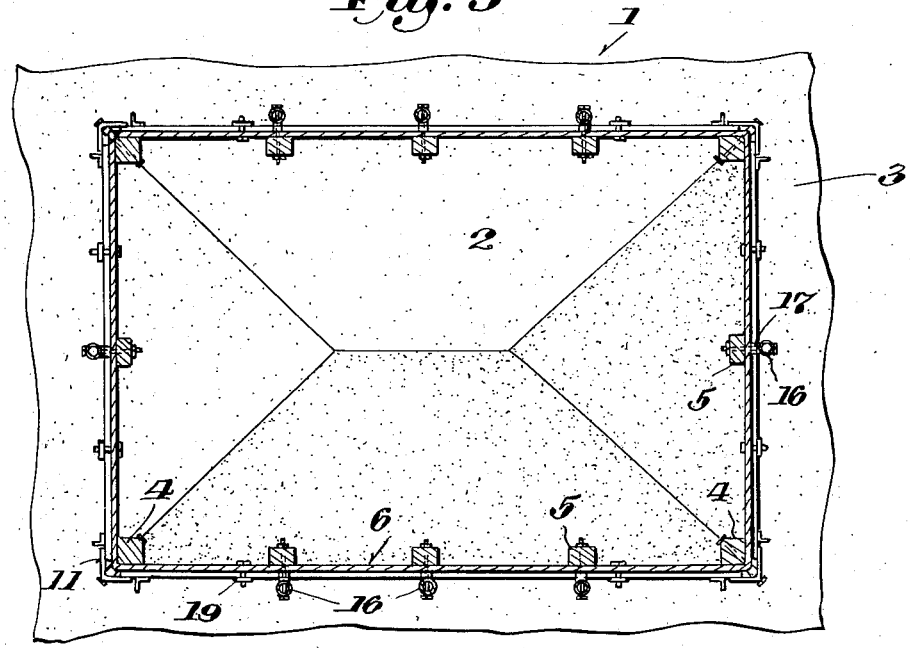
Fig. 3 is a horizontal sectional view taken on the line 3—3 of Fig. 1.

In the drawings the reference numeral 1 designates a base, which is preferably of monolithic concrete construction and comprises a central spreader portion 2 and a surrounding platform portion 3. The spreader portion 2 has downwardly and outwardly sloping surfaces, one for each of the apertured walls of the structure, adapted to cooperate with each aperture to form therewith a sort of chute for delivering feed by gravity down to the aperture. Since in the illustrated embodiment of the invention the building structure is rectangular and each of its four walls is provided with an aperture, the spreader has four sloping sides. The particular spreader is of generally pyramidal shape. It would be exactly pyramidal if the building structure were square in plan, but since the structure is oblong, the spreader vertex is a line rather than a point.

From the juncture of the platform surface 3 and each of the sloping surfaces of the spreader, a wall of the building rises. A convenient form of construction includes four corner posts, which may be set down in the concrete or merely based thereon, at the option of the builder. Suitable intermediate studs 5 are arranged between adjacent corner posts, and suitable siding 6, such as the weatherboarding shown in the figures, is fastened to the studs and corner posts to form side and end walls in a well understood manner.

A pitched roof 7 surmounts the walls, and an opening 8 is left in the higher side wall, immediately under the roof, through which feed may be put into the building.

Siding is omitted from the lower zone of one or more of the walls to provide in each such wall an aperture 9 for delivering feed from the building on to the platform 3. In the illustrated embodiment of the invention each of the walls is shown thus apertured, but it will be understood of course that any lesser number may be apertured.

Each aperture is provided with a cooperating gate 10 in the form of a board which is high enough to rest on the platform 3 and have its upper margin overlap the siding above the aperture. This is the closed position of the gate. The gate is mounted for vertical sliding movement in relation to the cooperating aperture so that more or less of the aperture may be exposed to vary its effective size and control the discharge of feed from the building.

It is in the arrangement for mounting the gates for their sliding movement and for permitting them easily to be manipulated and securely to be held in adjusted position that the present invention primarily resides. As shown in the drawings, ways are provided at each end of each aperture. Each way comprises an outer guide surface spaced from an inner guide surface, between which surfaces the end margins of the gates extend and slide when being raised or lowered. In the illustrated embodiment of the invention contiguous walls are apertured and provided with gates; hence I provide at the juncture of such walls a single element having way surfaces for each of the two gates which substantially meet at the corner. This single element comprises a comparatively large angle iron 11, having flanges of about three inches in width each. The angle iron is secured to the adjacent corner post 4 by carriage bolts 12 passed diagonally through the corner post and through the vertex of the angle iron. A sleeve 13 received over the bolt shank between the post and the angle iron serves to space the flanges of the iron sufficiently out from the plane of the siding 6 to form a pair of ways, one between each flange of the angle iron and the plane of the siding 6.

Inasmuch as siding is omitted to provide the aperture, it is desirable to secure a filler strip 14 to each corner post in the region where the siding is omitted. Each filler strip may be of the same thickness as the siding so that it forms the inner surface of the way, which rather snugly receives the gate so that the area of the gate that laps the siding makes a reasonably snug fit therewith. Each gate has a small angle 15 fastened vertically to it near each end and serving to cooperate with the edge of the adjacent flange of the angle iron 11 to keep the gate from wobbling unduly or binding when it is being moved up or down in the ways.

An appropriate number of stanchions 16, each conveniently in the form of a length of iron pipe, are set into the concrete platform and have their upper portions bolted to the siding above the highest level to which the gate will be raised. Suitable bushings 17 space the stanchions sufficiently from the siding to provide clearance for the gate, so that the stanchions serve to guide the gate and brace its intermediate portions against any bulging tendency resulting from the pressure of the feed or from any other cause. The number of stanchions 16 will depend on the length of the gate which they are to guide and brace. In the illustrated embodiment the side walls are approximately ten feet long and are provided with three stanchions, while the end walls, which are approximately six feet long, require only one stanchion each.

Above each aperture, higher than the range through which the gate 10 will be moved, a pin 18 projects from the wall. A length of relatively resilient strap iron 19 is fastened to the gate directly below the pin 18 and is provided with a number of holes, any one of which may receive the pin to hang the gate in vertically adjusted position, or lock it in completely closed position. In the illustrated embodiment of the invention each gate is provided with two hangers 19, and of course each wall has two pins 18, one for each of the hangers.

Figure 4:
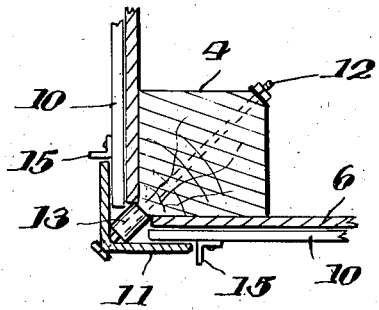
Fig. 4 is a detail cross sectional view taken through a corner of the structure.

The spacing of the two hangers for each gate is more or less symmetrical so as to provide good balanced support for the gate to which they are fastened. If the length of the particular wall is short enough, these two hangers may be set close enough together to enable a man to grasp both at once in his outstretched hands. In a building of the suggested dimensions the end wall hangers may be thus closely spaced, but the side wall hangers are best spaced farther apart. In an embodiment of the invention which I have built using the suggested dimensions, the side wall hangers are lifted or lowered a short distance one at a time, successively, until the gate has been moved to the new desired position, whereupon the pins 18 are set through the appropriate holes in the hangers. There is enough clearance or play of movement between the gates and their ways to permit this sort of rocking, and with grain in the building the pressure of the gates against the angle irons 11 and stanchions 16 is sufficient frictionally to hold the gates temporarily in position during adjustment. I regard this provision for loose play, clearly shown in Fig. 4, as an important feature of the invention in a preferred form of embodiment. Among other advantages, it permits a heavy gate, or one that is hard to lift because of the pressure of the contents of the building, to be lifted by a series of easy pulls each requiring less effort than would be necessary to lift the gate bodily straight up.

Figure 5:
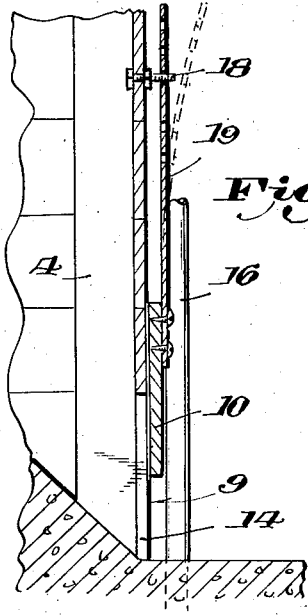
Fig. 5 is a vertical sectional view taken on the line 5—5 of Fig. 2.

In use, supposing a gate is in its lowermost position, so that the corresponding aperture is completely closed, the gate can be elevated by grasping its two hangers 19, pulling them outwardly beyond the ends of the pins 18, as shown in dotted lines in Fig. 5, and then pulling them upwardly to seat the pins in selected lower holes of each hanger. The resilience of the hangers causes them automatically to bend back from the dotted line position to the full line position to seat the pins in the selected holes. The hangers will remain in the new position until forcibly pulled out again, against their resilience, for further adjustment.

If desired, each pin 18 may be drilled to receive a cotter key or the like, or it may be threaded for a nut, to lock the hanger in adjusted position, but I have found in actual practice that no such locking is practically necessary. The resilience of the hangers holds them securely on the pins so that it is impossible for any live stock to unseat the hangers to change the adjustment of the gates.

It will be observed from the foregoing that I have provided a completely practical means for attaining the objects hereinabove set forth. It is believed that additional advantages will be obvious to and appreciated by those skilled in the art to which this invention pertains.

I claim:

In a hog feeder, a supporting base, an upright wall mounted on the base forming a part of a feed bin and having an aperture in its lower portion, horizontally spaced apart ways provided on the wall, a stanchion anchored in the base between the ways and disposed in spaced parallelism to the wall, a vertically slidable gate cooperating with the aperture and having its end portions movable in the ways and an intermediate portion movable in the space between the wall and the stanchion, hangers secured to the outer side of the gate on opposite sides of the center thereof and each provided with a plurality of vertically alined openings, pins projecting outwardly from the wall above the range of travel of each gate and adapted to be received selectively in the openings in the hangers to hang the gate in vertically adjusted position to uncover more or less of the aperture, and means securing the upper portion of the stanchion to the wall above the range of travel of the gate, sufficient clearance being provided between the gate and each of the ways to permit the gate to be rocked from one vertically adjusted position to another by successive vertical movements of said hangers, the gate being adapted to be pressed by the contents of the feeder into frictional engagement with the ways and with said stanchion during adjustment so that the gate will be held temporarily in the several positions to which it may be rocked, and the gate in all positions being substantially engaged with the wall to prevent leakage of the contents of the bin upwardly between the wall and the gate.

WILLARD CECIL.